United States Patent
Azuma et al.

(10) Patent No.: US 8,866,901 B2
(45) Date of Patent: Oct. 21, 2014

(54) MOTION CALCULATION DEVICE AND MOTION CALCULATION METHOD

(75) Inventors: Takahiro Azuma, Yokohama (JP); Masatoshi Okutomi, Tokyo (JP); Shigeki Sugimoto, Tokyo (JP)

(73) Assignee: Honda Elesys Co., Ltd., Yokohama (JP)

( * ) Notice: Subject to any disclaimer, the term of this patent is extended or adjusted under 35 U.S.C. 154(b) by 606 days.

(21) Appl. No.: 13/007,309

(22) Filed: Jan. 14, 2011

(65) Prior Publication Data

US 2011/0175998 A1 Jul. 21, 2011

Related U.S. Application Data

(60) Provisional application No. 61/295,448, filed on Jan. 15, 2010.

(30) Foreign Application Priority Data

Jun. 14, 2010 (JP) ................ P2010-135487

(51) Int. Cl.
  *H04N 7/18* (2006.01)
  *G06T 7/20* (2006.01)
  *G06K 9/00* (2006.01)

(52) U.S. Cl.
  CPC ..... *G06T 7/2033* (2013.01); *G06T 2207/20164* (2013.01); *G06T 2207/30244* (2013.01); *G06K 9/00798* (2013.01)
  USPC ............. 348/135; 348/61; 348/136; 348/137; 348/138; 348/139; 348/140; 348/141; 348/142

(58) Field of Classification Search
  CPC ............. G06K 9/00798; G06T 2207/20164; G06T 2207/30244; G06T 7/2033; G01B 11/022; G01B 11/024; H04N 7/18; H04N 7/181; G01C 15/00

USPC ........................................... 348/135
  See application file for complete search history.

(56) References Cited

U.S. PATENT DOCUMENTS 6,137,491 A * 10/2000 Szeliski .................. 345/419
6,353,678 B1 * 3/2002 Guo et al. ............... 382/154

(Continued)

FOREIGN PATENT DOCUMENTS

| JP | 2003-515827 A | 5/2003 |
| JP | 2006-350897 A | 12/2006 |
| WO | WO 01/39120 A2 | 5/2001 |

OTHER PUBLICATIONS

Tomoaki Teshima et al., "Real Time Method to Detect the Waving Drive from a Single Camera", The Institute of Electrical Engineers of Japan, 2009, vol. 129, No. 9, pp. 1714-1723.

(Continued)

*Primary Examiner* — Andy Rao
*Assistant Examiner* — Shan Elahi
(74) *Attorney, Agent, or Firm* — Arent Fox LLP

(57) ABSTRACT

A motion calculation device includes an image-capturing unit configured to capture an image of a range including a plane and outputs the captured image, an extraction unit configured to extract a region of the plane from the image, a detection unit configured to detect feature points and motion vectors of the feature points from a plurality of images captured by the image-capturing unit at a predetermined time interval; and a calculation unit configured to calculate the motion of the host device based on both of an epipolar constraint relating to the feature points and a homography relating to the region.

3 Claims, 2 Drawing Sheets

(56) References Cited

U.S. PATENT DOCUMENTS

| | | | | |
|---|---|---|---|---|
| 6,832,001 | B1* | 12/2004 | Kashiwagi | 382/166 |
| 7,027,659 | B1* | 4/2006 | Thomas | 382/254 |
| 7,149,325 | B2* | 12/2006 | Pavlidis et al. | 382/103 |
| 7,193,640 | B2* | 3/2007 | Egan | 347/171 |
| 7,567,704 | B2* | 7/2009 | Au et al. | 382/154 |
| 7,786,898 | B2* | 8/2010 | Stein et al. | 340/937 |
| 7,982,662 | B2* | 7/2011 | Shaffer | 342/158 |
| 8,134,479 | B2* | 3/2012 | Suhr et al. | 340/932.2 |
| 8,280,105 | B2* | 10/2012 | Kishikawa et al. | 382/103 |
| 8,401,276 | B1* | 3/2013 | Choe et al. | 382/154 |
| 2003/0053659 | A1* | 3/2003 | Pavlidis et al. | 382/103 |
| 2004/0222987 | A1* | 11/2004 | Chang et al. | 345/419 |
| 2005/0036659 | A1* | 2/2005 | Talmon et al. | 382/103 |
| 2005/0063596 | A1* | 3/2005 | Yomdin et al. | 382/232 |
| 2005/0185844 | A1* | 8/2005 | Ono et al. | 382/190 |
| 2007/0185946 | A1* | 8/2007 | Basri et al. | 708/200 |
| 2008/0033649 | A1* | 2/2008 | Hasegawa et al. | 701/301 |
| 2008/0273751 | A1* | 11/2008 | Yuan et al. | 382/103 |
| 2009/0010507 | A1* | 1/2009 | Geng | 382/128 |
| 2011/0090337 | A1* | 4/2011 | Klomp et al. | 348/144 |

OTHER PUBLICATIONS

Shigeki Sugimoto et al., "Efficient Plane-Parameter Estimation Using Stereo Images", Information Processing Society of Japan, Computer Vision and Image Media, Feb. 2007, vol. 48, No. SIGI(CVIM17), pp. 24-34.

Japanese Office Action, Application No. 2010-135487 dated Dec. 6, 2011.

Qifa KE et al., "Transforming Camera Geometry to A Virtual Downward-Looking Camera: Robust Ego-Motion Estimation and Ground-Layer Detection", Proceedings of the 2003 IEEE Computer Society Conference on Computer Vision and Pattern Recognition (CVPR'03), pp. 1-8.

Gideon P. Stein et al., "A Robust Method for Computing Vehicle Ego-motion", In IEEE Intelligent Vehicles, 2000, pp. 1-7.

Richard Szeliski et al., "Geometrically Constrained Structure from Motion: Points on Planes", In European Workshop on 3D Structure from Multiple Images of Large-scale Environments (SMILE), pp. 171-186, 1998.

* cited by examiner

MOTION CALCULATION DEVICE AND MOTION CALCULATION METHOD

CROSS REFERENCE TO RELATED APPLICATIONS

This application claims benefit from U.S. Provisional application Ser. No. 61/295,448, filed Jan. 15, 2010, and claims priority on Japanese Patent Application No. 2010-135487, filed Jun. 14, 2010, the contents of which are incorporated herein by reference.

BACKGROUND OF THE INVENTION

1. Field of the Invention

The present invention relates to a motion calculation device and a motion calculation method which calculates the motion of the host device based on captured images.

2. Description of Related Art

JP-A-2006-350897 describes a motion measurement device which measures the motion of a mobile object including image-capturing means based on an epipolar constraint relating to images captured by the image-capturing means.

JP-T-2003-515827 describes a system which predicts the motion (egomotion) of transfer means including a camera based on a homography relating to the images captured by the camera.

However, in the motion measurement device described in JP-A-2006-350897, there is a problem in that, when there are a small number of feature points corresponding to, for example, a stationary object in an image captured by an image-capturing unit, it is very difficult to calculate the motion of the host device based on the epipolar constraint relating to the feature points.

In the system described in JP-T-2003-515827, there is a problem in that, in the image captured by the image-capturing unit, when there is insufficient texture in a region of a plane, it is very difficult to calculate the motion of the host device based on the homography relating to the plane.

SUMMARY OF THE INVENTION

The invention has been finalized in consideration of the above-described situation, and an object of the invention is to provide a motion calculation device and a motion calculation method capable of stably calculating the motion of the host device.

The invention has been finalized in order to solve the above-described problems, and provides a motion calculation device. The motion calculation device includes an image-capturing unit configured to capture an image of a range including a plane and outputs the captured image, an extraction unit configured to extract a region of the plane from the image, a detection unit configured to detect feature points and motion vectors of the feature points from a plurality of images captured by the image-capturing unit at a predetermined time interval, and a calculation unit configured to calculate the motion of the host device based on both of an epipolar constraint relating to the feature points and a homography relating to the region.

In the motion calculation device, the calculation unit may minimize a cost function based on the epipolar constraint and the homography to calculate the motion.

The invention provides a motion calculation method in a motion calculation device which calculates the motion of the host device. The motion calculation method includes causing an image-capturing unit to capture an image of a range including a plane and to output the captured image, causing an extraction unit to extract a region of the plane from the image, causing a detection unit to detect feature points and motion vectors of the feature points from a plurality of images captured by the image-capturing unit at a predetermined time interval, and causing a calculation unit to calculate the motion of the host device based on both of an epipolar constraint relating to the feature points and a homography) relating to the region.

According to the invention, the motion calculation device calculates the motion of the host device based on the epipolar constraint relating to the feature points in the images and the homography relating to the region of the plane. Therefore, the motion calculation device can stably calculate the motion of the host device compared to a where the motion of the host device is calculated based on either the epipolar constraint or the homography.

DETAILED DESCRIPTION OF INVENTION

First Embodiment

Figure 1:
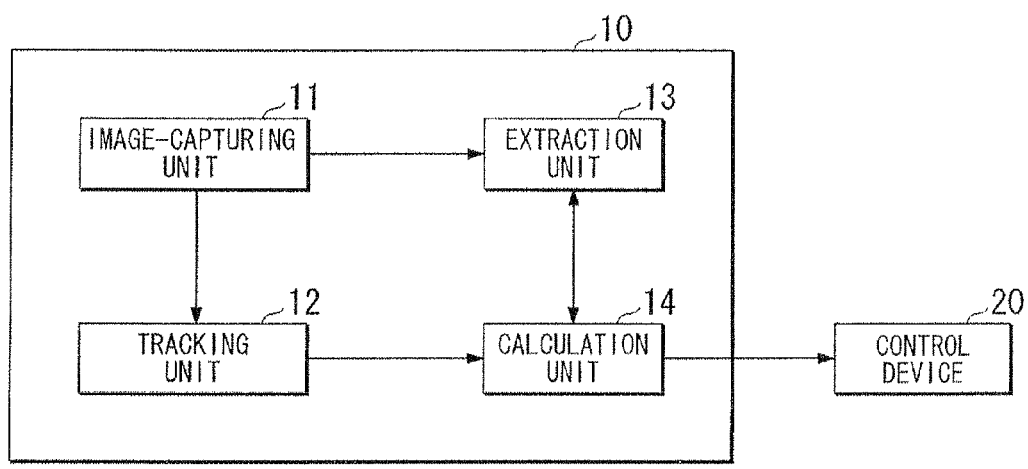
FIG. 1 is a block diagram showing the configuration of a camera system according to an embodiment of the invention.

A first embodiment of the invention will be described in detail with reference to the drawings, FIG. 1 is a block diagram showing the configuration of a camera system. A camera system is provided in a mobile object. The mobile object is, for example, a vehicle. The camera system includes a motion calculation device 10, and a control device 20.

The motion calculation device 10 captures an image of a range including a plane (for example, the ground) and calculates the motion (hereinafter, referred to as a "camera motion") of the host device based on the captured image. The motion calculation device 10 outputs the calculated camera motion to the control device 20.

The motion calculation device 10 includes an image-capturing unit 11, a tracking unit (detection unit) 12, an extraction unit 13, and a calculation unit 14. The image-capturing unit 11 includes a light-receiving element, and the light-receiving surface of the light-receiving element has a plurality of pixels. An optical image is formed on the light-receiving surface by an optical system. The image-capturing unit 11 captures age of a range including a plane in a predetermined cycle and outputs the captured image to the tracking unit 12 and the extraction unit 13. Hereinafter, an image I captured by the image-capturing unit 11 at the time t is denoted by an image $I_t$. Hereinafter, in the coordinate system with the principal point of the image-capturing unit 11 as the origin, the coordinate system with the optical axis direction as the Z axis is referred to as a "camera coordinate system". The direction of light incident at the coordinate $(x_p, y_p)$ in the camera coordinate system is denoted by a direction vector $p=[x,y,z]^T$ (the superscript T means transposition). The pixel value of a point p constituting the image $I_t$ is denoted by $I_t(p)$ using the direction vector p. The pixel value may be calculated through interpolation from the pixel values of peripheral pixels. It is assumed that the image-capturing unit 11 is calibrated in advance.

The image $I_t$ captured by the image-capturing unit 11 in a predetermined cycle is input to the tracking unit 12. The tracking unit 12 detects feature points from the image $I_t$ using a Harris operator or the like. The tracking unit 12 also detects the motion vectors of the feature points. Hereinafter, a set of feature points extracted by the tracking unit 12 is denoted by a set $S_t$. The tracking unit 12 detects a corresponding point $q_k$ corresponding to the same position in an observed scene (for example, a subject) of the image $I_t$ for a k-th feature point $p_k$ constituting a set $S_{t-1}$ of feature points in an image $I_{t-1}$ captured at the time t−1 using a Lucas-Kanade method or the like. Hereinafter, a set of feature point correspondences $(p_k,q_k)$ (i.e., a set of pairs of feature point and corresponding point) is denoted by $\Psi_t$.

The tracking unit 12 excludes, from $\Psi_t$, a feature point correspondence $(p_k,q_k)$ which does not follow the epipolar constraint relating to the feature points of a static background (for example, captured ground or building) using RANSAC (RANdom SAmple Consensus) or the like. The tracking unit 12 outputs the set $\Psi_t$ of feature point correspondences to the calculation unit 14. The tracking unit 12 performs the above-described processing for each image $I_t$ to track the feature points within the image.

The set $\Psi_t$ of feature point correspondences is input from the tracking unit 12 to the calculation unit 14. A region of a plane (hereinafter, referred to as a "plane region") in the image $I_t$ is input from the extraction unit 13 to the calculation unit 14. Here, it is assumed that the plane region is expressed by a set $\Pi_t=\{B_i|i=1\ldots m\}$ of a plurality of blocks obtained by dividing the image $I_t$. It is also assumed that the initial value of the set $\Pi_t$ is predefined. For example, when the motion calculation device 10 is provided in a vehicle, the initial value of the plane region $\Pi_t$ is defined by the blocks $\{B_i|i=1\ldots m\}$ of a high-incidence region (for example, the second half of the image) with the ground in the image $I_t$.

The calculation unit 14 stores the vector $n=[n_x,n_y,n_z]^T$ of a three-dimensional parameter representing a plane $n_xX+n_yY+n_zZ=1$ on the X-Y-Z coordinate system with a predetermined position as the origin. Here, the initial value $n_0$ of the vector n is predefined based on the installation orientation of the motion calculation device 10 with respect to the plane on which the mobile object is connected to the ground. For example, the initial value $n_0$ is predefined based on the installation orientation of the motion calculation device 10 with respect to the ground on which the vehicle is connected.

The calculation unit 14 calculates the camera motion and the orientation of the plane (hereinafter, referred to as a "plane orientation") with respect to the host device based on both of an epipolar constraint relating to the feature points and a homography relating to the plane region. Specifically, the calculation unit 14 minimizes a cost function based on both of a set $\Psi_t$ of feature point correspondences and a plane region $\Pi_t$ to calculate a parameter $\mu=[\omega^T,t^T,n^T]$ representing the camera motion and the plane orientation. Here, the can era motion is constituted by a rotation parameter $\omega^T=[\omega_x,\omega_y,\omega_z]$ and a translation vector $t^T=[t_x,t_y,t_z]$. The plane orientation is expressed by $n^T=[n_x,n_y,n_z]$.

The cost function is expressed by Expression (1).

$$Q_1(\mu) = \sum_{p \in B, B \in \Pi_t} \alpha_p \{I_t(w(p;\mu)) - I_{t-1}(p)\}^2 + \sum_{(p,q) \in \Psi_t} \beta_p \{q^T[t] \times R(\omega)p\}^2 + \lambda(t^Tt - v^2)^2 \quad (1)$$

In Expression (1), $[t]_x$ is a cross product operator of a vector t which is expressed by a 3×3 matrix. $R(\omega)$ is a rotation matrix which is defined by the rotation parameter $\omega$. A warp function W in the first a function which represents homography transformation for the plane region and is defined in accordance with the parameter μ representing the camera motion and the plane orientation. The first term is called a homography constraint term and represents an error in the homography transformation from the plane region of the image $I_{t-1}$ to the plane region of the image $I_t$.

Here, it is assumed that, with the motion of the motion calculation device 10, a feature point p in the plane region of the image $I_{t-1}$ moves to a feature point q in the plane region of the image $I_t$. In this case, the relationship shown in Expression (2) is established between the feature point p and the feature point q.

$$q \sim (R(\omega) - tn^T)p \quad (2)$$

In Expression (2), the symbol "~" represents that the vectors of both sides are in parallel and the same except for the scale. The vector p and the vector n expressed by the camera coordinate system at the time t−1. Meanwhile, the vector q and the vector t expressed by the camera coordinate system at the time t.

Here, $H=R(\omega)-tn^T$ which is a 3×3 matrix is taken into consideration. If the row vectors of the matrix H are denoted by $h_1$, $h_2$, and $h_3$, the warp function W which represents the transformation from the feature point $p=[x,y,1]^T$ to the corresponding point $q=[x',y',1]^T$ is expressed by Expression (3).

$$q = w(p;\mu) = \frac{1}{h^T p}(Hp) \quad (3)$$

The second term in Expression (1) is called an epipolar constraint term and represents the epipolar constraint. When the feature point moves from the coordinate p to the coordinate q, Expression (4) is satisfied by the epipolar constraint.

$$q^T[t] \times R(\omega)p = 0 \quad (4)$$

In general, the left side does not become "0" due to errors of the parameters and observation errors of the vector p and the vector q. For this reason, it is considered that the left side in Expression (4) is an algebraic error on the epipolar constraint. Thus, the second term in Expression (1) represents the sum of square errors concerning the epipolar constraint.

The third term in Expression (1) is a regularization term in which the magnitude of the translation vector is v. Here, $\alpha_p$, $\beta_p$, and $\lambda$ in Expression (1) are weight coefficients. The third term in Expression (1) is added to Expression (1) so as to resolve the scale ambiguity of the translation vector t. For example, when the speed information of the mobile object is not obtained, v=1 may be set. In this case, the estimated distance the motion calculation device 10 to the plane and the estimated distance from the motion calculation device 10 to each feature point have values proportional to the norm of the translation vector t.

The calculation unit 14 improves the estimation value of the parameter μ using a variate δ so as to minimize the cost function. The calculation unit 14 minimizes the value of the cost function by, for example, a Gauss-Newton method.

If the inside of each square error in Expression (1) is primarily approximated to the variate δ of the parameter μ, Expression (5) is established. Here, $r_w$, $r_e$, and $r_v$ are residual errors on the parameters μ of the respective terms in Expression (5). $r_w$ is expressed by Expression (6), $r_e$ is expressed by Expression (7), and $r_v$ is expressed by Expression (8), $$Q(\mu + \delta) = \qquad (5)$$

$$\sum_{p \in B_1 \ldots B_m} \alpha_p \{r_w + J_w^T \delta\}^2 + \sum_{(p,q) \in \Psi_t} \beta_p \{r_e + J_e^T \delta\}^2 + \lambda (r_v + J_v^T \delta)^2$$

$$r_w = I_t(w(p;\mu)) - I_{t-1}(p) \qquad (6)$$

$$r_e = q^T [t] \times R(\omega) p \qquad (7)$$

$$r_v = t^T t - v^2 \qquad (8)$$

If a definition is made as expressed by Expression (9), Jacobian $J_w$ at the feature point p is expressed by Expression (10) using the current set parameter set value $\mu = [\omega^T, t^T, n^T]$.

$$\begin{bmatrix} x_h \\ y_h \\ z_h \end{bmatrix} = \{R(\omega) - tn^T\} p \qquad (9)$$

$$J_w = \frac{1}{z_h} \begin{bmatrix} -g_x y x_h - g_y (1 - y y_h) \\ g_x (1 + x x_h) + g_y (x y_h) \\ -g_x y - g_y x \\ -g_x (n^T p)^{-1} \\ -g_y (n^T p)^{-1} \\ (g_x x_h + g_y y_h)(n^T p)^{-1} \\ g_x x(x_h t_z - t_x) + g_y x(y_h t_z - t_y) \\ g_x y(x_h t_z - t_x) + g_y y(y_h t_z - t_y) \\ g_x (x_h t_z - t_x) + g_y (y_h t_z - t_y) \end{bmatrix} \qquad (10)$$

$J_e$ which appears in the differentiation of the second term in Expression (5) is expressed by Expression (11). Here, Expression (12) is established, $J_v$ which appears in the differentiation of the third term in Expression (5) is expressed by Expression (13).

$$J_e = \begin{bmatrix} \hat{q}_3 y - \hat{q}_2 \\ \hat{q}_1 - \hat{q}_3 x \\ \hat{q}_2 x - \hat{q}_1 y \\ \hat{p}_2 - \hat{p}_3 y' \\ \hat{p}_3 x' - \hat{p}_1 \\ \hat{p}_1 y' - \hat{p}_2 x' \\ 0 \\ 0 \\ 0 \end{bmatrix} \qquad (11)$$

$$\begin{cases} \begin{bmatrix} \hat{p}_1 \\ \hat{p}_2 \\ \hat{p}_3 \end{bmatrix} = R(\omega) p \\ \begin{bmatrix} \hat{q}_1 \\ \hat{q}_2 \\ \hat{q}_3 \end{bmatrix} = q^T [t]_x \end{cases} \qquad (12)$$

$$J_v = 2 r_v \begin{bmatrix} 0 \\ 0 \\ 0 \\ 2 t_x \\ 2 t_y \\ 2 t_z \\ 0 \\ 0 \\ 0 \end{bmatrix} \qquad (13)$$

If the differentiation for $\delta$ in Expression (5) is set to a value "0", Expression (14) is established.

$$2 \sum_p \alpha_p J_w \{r_w + J_w^T \delta\} + 2 \sum_{(p,q)} \beta_p J_e \{r_e + J_e^T \delta\} + 2 \lambda J_v (r_v + J_v^T \delta) = 0 \qquad (14)$$

If a theorem is built for $\delta$, Expression (14) is expressed by Expression (15).

$$\left[ \sum_p \alpha_p \{J_w J_w^T\} + \sum_{(p,q)} \beta_p \{J_e J_e^T\} + \lambda J_v J_v^T \right] \delta = \qquad (15)$$
$$- \sum_p \alpha_p \{r_w J_w\} - \sum_{(p,q)} \beta_p \{r_e J_e\} - \lambda r_v J_v$$

The left side in Expression (15) is the product of a 9×9 matrix and a nine-dimensional parameter vector $\delta$. The right side in Expression (15) is a nine-dimensional vector. As described above, Expression (15) is a linear simultaneous equation, such that a solution can be found for $\delta$. $\delta$ gives the approximate value ($\mu+\delta$) of the optimum value of the parameter estimation value $\mu$.

As described above, the calculation unit 14 repeatedly updates the parameter estimation value $\mu$ until the value of the cost function ceases to improve and, when the value of the cost function ceases to improve, determines that the solution converges. When the solution converges, the calculation unit 14 outputs the parameter estimation value $\mu = [(\omega^T, t^T, n^T]$ to the extraction unit 13.

The weight coefficients $\alpha_p$, $\beta_p$, and $\lambda$ may be values experimentally defined or may be defined as follows. Each term in Expression (1) is in the form of square minimization, such that it can be seen that the cost function expressed in Expression (1) is in the form of Expression (I) which represents a negative log likelihood based on the probability distribution for each of the errors $r_w$, $r_e$, and $r_v$.

$$L(\mu) = -\log \prod_p p_p(r_w | \mu) - \log \prod_{(p,q)} p_{p,q}(r_e | \mu) - \log p(r_v | \mu) \qquad (I)$$

In Expression (I), the notation p(r|A) represents the probability density of the occurrence of the observed value r under the condition A. The subscript p of the first term in Expression (I) represents the probability density function for each point p in the image. The subscripts p and q of the second term Expression (I) represent the probability density function for each feature point correspondence (p,q).

If it is assumed that the probability distribution of each term is the normal probability distribution, Expression (I) is expressed by Expression (II).

$$L(\mu) = c \sum_{p} \left\{ \frac{r_w^2}{2\sigma_w^2} \bigg|_p \right\} + \sum_{(p,q)} \left\{ \frac{r_e^2}{2\sigma_e^2} \bigg|_{(p,q)} \right\} + \frac{r_v^2}{2\sigma_v^2} \quad (II)$$

In Expression (II), the notation $A|_p$ represents the evaluation of Expression A for the point p in the image. The notation $A|_{(p,q)}$ represents the evaluation of Expression A for the feature point correspondence (p,q) in the image, $\sigma_w$ is the standard deviation of error relating to the homography transformation. $\sigma_e$ is the standard deviation of error relating to the epipolar constraint. $\sigma_v$ is the standard deviation of error relating to the speed. The constant term C has nothing to do with the minimization of Expression (II) and may thus be negligible.

If Expression (II) is minimized, a parameter which maximizes the likelihood of the observed value is estimated. Thus, when the noise standard deviations $\sigma_w$, $\sigma_e$, and $\sigma_v$ are given, $\alpha$, $\beta$, and $\gamma$ in Expression (1) are respectively the reciprocals of the squares of $\sigma_w$, $\sigma_e$, and $\sigma_v$ from the viewpoint that the best likelihood value is estimated.

As described above, the weight coefficients $\alpha_p$, $\beta_p$, and $\lambda$ are defined using the approximate model (Expression (II)) of the relationship between information concerning the luminance, gradient, and the positions of the feature points in the image and the noise standard deviations. In this way, it can be anticipated that the performance of estimating the camera motion and the plane orientation is improved compared to a case where the weight coefficients are defined experimentally.

Returning to FIG. 1, the description of the configuration will be continued. The parameter estimation value μ calculated by the calculation unit 14 is input to the extraction unit 13. The image $I_t$ captured by the image-capturing unit 11 in a predetermined cycle is input to the extraction unit 13. The extraction unit 13 divides the image $I_t$ into a plurality of blocks of a predefined size so as to extract a region of a plane from the image $I_t$. The extraction unit 13 estimates the parameter (vector) n of the plane orientation for each black and extracts a set of blocks conforming to the plane orientation as a plane region.

In Expression (1), the first term which is the only term related to the plane orientation is used as the cost function on the plane orientation. The cost function on the plane orientation is expressed by Expression (16).

$$Q_B(\mu) = \sum_{p \in B} \alpha_p \{I_t(w(p; n_B, \omega, t)) - I_{t-1}(p)\}^2 \quad (16)$$

The value of the cost function of Expression (16) is minimized for the parameter $n_B$ of the plane orientation of a block B. Here, as in Expression (1), the parameter $n_B$ is updated by solving the simultaneous equation (17) of the first term related to the plane orientation for each of both sites of Expression (15).

$$\left[ \sum_p \{J'_w J'^T_w\} \right] \delta' = -\sum_p \{r_w J'_w\} \quad (17)$$

In Expression (17), $J'_w$ is a vector which has only three components concerning the parameter n of the plane orientation. $\delta'$ is a three-dimensional vector for updating the three components related to the parameter n of the plane orientation. That is, $J'_w$ refers to the three components in Expression (10) and is expressed by Expression (18).

$$J'_w = \frac{1}{z_h} \begin{bmatrix} g_x x(x_h t_z - t_x) + g_y x(y_h t_z - t_y) \\ g_x y(x_h t_z - t_x) + g_y y(y_h t_z - t_y) \\ g_x(x_h t_z - t_x) + g_y(y_h t_z - t_y) \end{bmatrix} \quad (18)$$

The left side in Expression (17) is the product of a 3×3 square matrix and a three-dimensional vector $\delta'$. The right side in Expression (17) is a three-dimensional vector. Thus, $\delta'$ is calculated as the solution of the linear simultaneous equation.

The extraction unit 13 calculates the difference between the parameter $n_B$ of the plane orientation of the block B and the parameter n of the plane orientation over the entire plane region. When the difference between the parameter $n_B$ of the plane orientation and the parameter n of the plane orientation is equal to or smaller than a predetermined threshold value, the extraction unit 13 determines that the block B is a block which belongs to the plane region and adds the block B to the set $\Pi_t$ of blocks to update the set $\Pi_t$. Here, the predetermined threshold value is, for example, the Euclidean distance between the parameter $n_B$ and the parameter n. The extraction unit 13 outputs the updated set $\Pi_t$ to the calculation unit 14.

The calculation unit 14 calculates nine parameters included in the camera motion and the plane orientation based on the set $\Pi_t$ updated by the extraction unit 13. Here, with the stopping condition that the value of the cost function in Expression (1) is not improved, the calculation unit 14 repeatedly calculates the nine parameters included in the camera motion and the plane orientation until the stopping condition is satisfied. The calculation unit 14 outputs the finally calculated camera motion and plane orientation to the control device 20.

Here, as the number of blocks representing the plane region decreases, the value of the cost function in Expression (1) decreases. As the number of blocks representing the plane region decreases, estimation accuracy of the camera motion and the plane orientation is lowered. Thus, as the stopping condition for stopping the processing for calculating the camera motion and the plane orientation, Expression (19) which is obtained by normalizing the first terra in Expression (1) with the number of blocks may be used.

$$Q'(\mu) = \frac{1}{|\Pi_t|} \sum_{p \in B, B \in \Pi_t} \alpha_p \{I_t(w(p; \mu)) - I_{t-1}(p)\}^2 + \sum_{(p,q) \in \Psi_t} \beta_p \{q^T[t] \times R(\omega)p\}^2 + \lambda(t^T t - v^2)^2 \quad (19)$$

The camera and the plane orientation are input from the calculation unit 14 of the motion calculation device 10 to the control device 20. The control device 20 performs predetermined processing based on the motion and the plane orientation. Here, the predetermined processing refers to, for example, processing in which the three-dimensional positions of the feature points are calculated based on the camera motion through triangulation and, when a cluster of calculated feature points is a cluster outside the plane region based on the plane orientation, the cluster is displayed on the screen (not shown) as an obstacle. For example, the predetermined processing may be a processing in which an avoidance traction is issued to the mobile object such that the mobile object avoids the cluster outside the plane region. In this case, the predetermined processing may be a processing in which an avoidance instruction is issued to a vehicle including the camera system (motion calculation device 10 and control device 20) such that the vehicle avoids another vehicle which is traveling ahead.

Next, the operation procedure of the motion calculation device 10 will be described.

Figure 2:
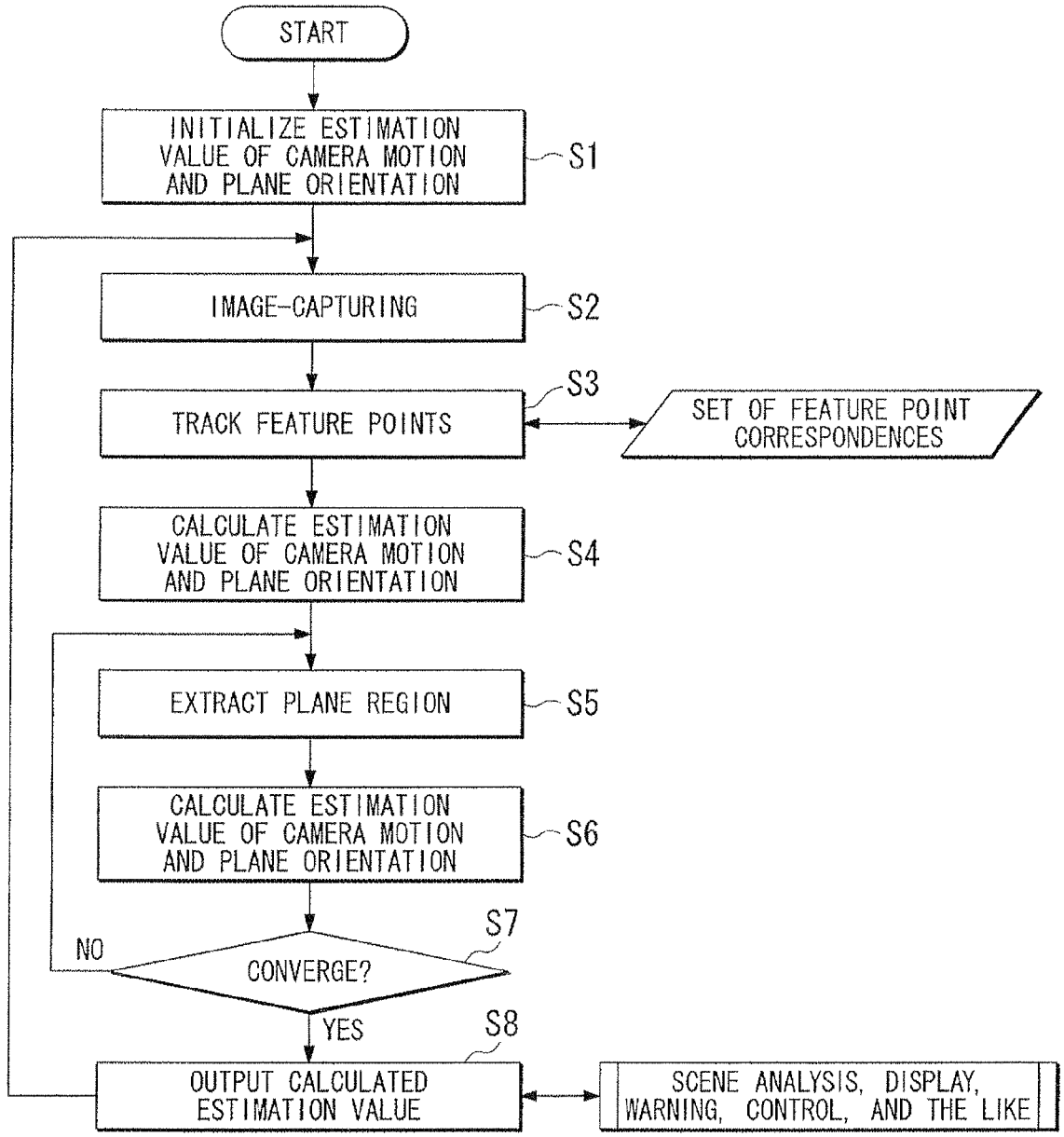
FIG. 2 is a flowchart showing the operation procedure of the motion calculation device according to the embodiment of the invention.

FIG. 2 is a flowchart showing the operation procedure of the motion calculation device according to the embodiment of the invention.

The calculation unit 14 initializes the estimation value µ of the camera motion and the plane orientation (Step S1). The image-capturing unit 11 captures image of a range including a plane (Step S2). The tracking unit 12 tracks the feature point p within the image. The tracking unit 12 outputs the set $\Psi_t$ of feature point correspondences to the calculation unit 14 (Step S3). The calculation unit 14 calculates the estimation value µ of the camera motion and the plane orientation (Step S4).

The extraction unit 13 extracts the plane region (Step S5). The calculation unit 14 calculates the estimation value µ of the camera motion and the plane orientation (Step S6). The calculation unit 14 determines whether or not the solution converges (Step S7). When the solution does not converge (Step S7—No), the operation of the calculation unit 14 returns to Step S5. Meanwhile, when the solution converges (Step S7—Yes), the calculation unit 14 outputs the calculated camera motion and plane orientation to the control device 20. The control device 20 performs predetermined processing (scene analysis, display, warning, control, and the like) (Step S7).

As described above, the motion calculation device 10 includes the image-capturing unit 11 which captures the image of the range including the plane and outputs the captured image, the extraction unit 13 which extracts the region of the plane from the image, the tracking unit 12 which detects the feature points and the motion vectors of the feature points from a plurality of images captured by the image-capturing unit 11 at a predetermined time interval, and the calculation unit 14 which calculates the motion (camera motion) of the host device based on both of the epipolar constraint relating to the feature points and the homography relating to the region.

Thus, the motion calculation device can stably calculate the camera motion compared to a case where the camera motion is calculated based on either the epipolar constraint or the homography.

The calculation unit 14 minimizes the cost function based on the epipolar constraint and the homography to calculate the motion of the host device. Thus, the motion calculation device can stably calculate the camera motion based on the cost function.

Second Embodiment

A second embodiment of the invention will be described in detail with reference to the drawings. In the second embodiment, the regularization term of the cost function is different from that in the first embodiment. Hereinafter, a description will be provided of only differences from the first embodiment.

When it is assumed that the distance d between the principal point of the image-capturing unit 11 (see FIG. 1) and the plane is substantially constant, the speed information (the magnitude of the translation vector) v of the host device may not be included in the regularization term (third term) in Expression (1). The relationship $|n|^2 = d^{-2}$ is established when the distance d between the principal point of the image-capturing unit 11 and the plane expressed by $n^T P = 1$ is expressed by $d = -1/|n|$. Thus, when it is assumed that the distance d between the principal point of the image-capturing unit 11 to the plane is substantially constant, the cost function is expressed by Expression (20).

$$Q_d(\mu) = \sum_{p \in B, \, B \in \Pi_t} \alpha_p \{I_t(w(p; \mu)) - I_{t-1}(p)\}^2 + \quad (20)$$
$$\sum_{(p,q) \in \Psi_t} \beta_p \{q^T[t] \times R(\omega)p\}^2 + \lambda(n^T n - d^{-2})^2$$

The calculation unit 14 minimizes the value of the cost function using Expression (21), instead of Expression (8).

$$r_v = n^T n - d^{-2} \quad (21)$$

$$J_v = 2r_v \begin{bmatrix} 0 \\ 0 \\ 0 \\ 0 \\ 0 \\ 0 \\ 2n_x \\ 2n_y \\ 2n_z \end{bmatrix} \quad (22)$$

The calculation unit 14 minimizes the value of the cost function using Expression (22), instead of Expression (13).

As described above, the calculation unit 14 minimizes the cost function, which does not include the speed information v of the host device, to calculate the motion of the host device. Thus, the motion calculation device can stably calculate the camera a without using the speed information v.

Although the embodiments of the invention have been described in detail with reference to the drawings, the specific configuration is not limited to the embodiments and may include design and the like without departing from the scope and spirit of the invention.

A program for implementing the above-described motion calculation device may be recorded in a computer-readable recording medium, and the program may be loaded and executed on a computer system. The term "computer system" used herein is a concept including an OS or hardware, such as peripheral devices. The "computer-readable recording medium" refers to a portable medium, such as a flexible disk, a magneto-optical disk, a ROM, or a CD-ROM, or a storage device, such as a hard disk incorporated into the computer system. The "computer-readable recording medium" includes a medium which holds the program for a predetermined time such as a volatile memory (RAM) in the computer system which serves as a server or a client when the program is transmitted through a network, such as Internet, or a communication link, such as a telephone link. The program may be transmitted from the computer system which stores the program in the storage device or the like to another computer system through a transmission medium or transmission waves in the transmission medium. The "transmission medium" for transmitting the program refers to a medium having a function of transmitting information, for example, a network, such as Internet, or a communication link (communication line), such as a telephone link. The program may implement a portion of the above-described function. The program may be a program which can implement the above-described function through a combination with a program previously stored in the computer system, that is, a so-called differential file (differential program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motion calculation device comprising:
    an image-capturing unit configured to capture an image of a range including a plane and to output the captured image;
    an extraction unit configured to extract a plane region from the image by selecting image blocks from the image and by incorporating some of the image blocks into the plan region when a difference between a plane orientation of each of the image blocks and that of the plane region is smaller than a predetermined threshold;
    a detection unit configured to detect feature points and motion vectors of the feature points from a plurality of images captured by the image-capturing unit at a predetermined time interval and to output a set of feature point correspondences; and
    a calculation unit configured to receive the set of feature point correspondences from the detection unit and to calculate the motion of the host device by simultaneously using both of an epipolar constraint relating to the feature points and a homography relating to the plane region, wherein the motion of the host device comprises a rotation parameter $\omega^T=[\omega_x,\omega_y,\omega_z]$ and a translation vector $t^T=[t_x,t_y,t_z]$, wherein a plane orientation is expressed by $n^T=[n_x,n_y,n_y]$, and
    wherein the calculation unit minimizes a cost function expressed by $$Q_1(\mu) = \sum_{p \in B, B \in \Pi_t} \alpha_p \{I_t(w(p;\mu)) - I_{t-1}(p)\}^2 +$$
$$\sum_{(p,q) \in \Psi_t} \beta_p \{q^T[t] \times R(\omega)p\}^2 + \lambda(t^T t - v^2)^2,$$

where $I_t$ represents an image at time t, (p,q) represents a feature point correspondence, $\Psi_t$ represents a set of feature point correspondences, B represents a plane region in an image, $\pi_t$ represents a set of plane regions, $\mu$, $\omega$, t, and $R(\omega)$ represent motion parameters of the image-capturing unit, v represents speed information of the host device, $w(p;\mu)$ represents warp function, and $\alpha_p$, $\beta_p$, and $\lambda$ represent weight coefficients.

2. The motion calculation device according to claim 1, wherein the calculation unit is configured to minimize a cost function based on the epipolar constraint and the homography to calculate the motion.

3. A motion calculation method in a motion calculation device which calculates the motion of the host device, the motion calculation method comprising:
    causing an image-capturing unit to capture an image of a range including a plane and to output the captured image;
    causing an extraction unit to extract a plane region from the image by selecting image blocks from the image and by incorporating some of the image blocks into the plane region when a difference between a plane orientation of each of the image blocks and that of the plane region is smaller than a predetermined threshold;
    causing a detection unit to detect feature points and motion vectors of the feature points from a plurality of images captured by the image-capturing unit at a predetermined time interval and to output a set of feature point correspondences; and
    causing a calculation unit to receive the set of feature point correspondences from the detection unit and to calculate the motion of the host device by simultaneously using both of an epipolar constraint relating to the feature points and a homography relating to the plane region, wherein the motion of the host device comprises a rotation parameter $\omega^T=[\omega_x,\omega_y,\omega_z]$ and a translation vector $t^T=[t_x,t_y,t_z]$, wherein a plane orientation is expressed by $n^T=[n_x,n_y,n_z]$, and
    wherein the calculation unit minimizes a cost function expressed by $$Q_1(\mu) = \sum_{p \in B, B \in \Pi_t} \alpha_p \{I_t(w(p;\mu)) - I_{t-1}(p)\}^2 +$$
$$\sum_{(p,q) \in \Psi_t} \beta_p \{q^T[t] \times R(\omega)p\}^2 + \lambda(t^T t - v^2)^2$$
$$Q_1(\mu) = \sum_{p \in B, B \in \Pi_t} \alpha_p \{I_t(w(p;\mu)) - I_{t-1}(p)\}^2 +$$
$$\sum_{(p,q) \in \Psi_t} \beta_p \{q^T[t] \times R(\omega)p\}^2 + \lambda(t^T t - v^2)^2,$$

where $I_t$ represents an image at time t, (p,q) represents a feature point correspondence $\Psi_t$ represents a set of feature point correspondences, B represents a plane region in an image, $\pi_t$ represents a set of plane regions, $\mu$, $\omega$, t, and $R(\omega)$ represent motion parameters of the image-capturing unit, v represents speed information of the host device, $w(p;\mu)$ represents warp function, and $\alpha_p$, $\beta_p$, and $\lambda$ represent weight coefficients.

* * * * *